US012731143B2

(12) United States Patent
Yerli

(10) Patent No.: US 12,731,143 B2
(45) Date of Patent: Sep. 8, 2026

(54) CRYPTOGRAPHIC DIGITAL ASSETS MANAGEMENT SYSTEM

(71) Applicant: TMRW Group IP, Luxembourg (LU)

(72) Inventor: Cevat Yerli, Frankfurt am Main (DE)

(73) Assignee: TMRW Group IP, Luxembourg (LU)

( * ) Notice: Subject to any disclaimer, the term of this patent is extended or adjusted under 35 U.S.C. 154(b) by 156 days.

(21) Appl. No.: 17/723,343

(22) Filed: Apr. 18, 2022

(65) Prior Publication Data

US 2023/0334494 A1 Oct. 19, 2023

(51) Int. Cl.

| | |
|---|---|
| ***G06Q 20/40*** | (2012.01) |
| ***G06Q 20/06*** | (2012.01) |
| ***G06Q 20/36*** | (2012.01) |
| ***G06Q 20/38*** | (2012.01) |
| ***G06Q 30/0601*** | (2023.01) |

(52) U.S. Cl.

CPC ..... *G06Q 20/4014* (2013.01); *G06Q 20/0652* (2013.01); *G06Q 20/363* (2013.01); *G06Q 20/3825* (2013.01); *G06Q 30/0643* (2013.01)

(58) Field of Classification Search

CPC ........... G06Q 20/4014; G06Q 20/0652; G06Q 20/363; G06Q 20/3825; G06Q 30/0643; G06Q 30/0206; G06Q 20/02; G06Q 40/04; G06Q 30/02; G06Q 50/10; G06Q 10/10; G06Q 20/065; H04L 2209/56; H04L 9/50; H04L 9/3213; H04L 67/1097; G06F 3/013

See application file for complete search history.

(56) References Cited

U.S. PATENT DOCUMENTS

| | | | | |
|---|---|---|---|---|
| 9,912,768 | B1 * | 3/2018 | Choi | H04L 67/025 |
| 10,051,327 | B1 * | 8/2018 | Nieuwenhuys | H04N 21/8456 |
| 11,276,247 | B1 * | 3/2022 | Delgado | G06T 19/003 |
| 2008/0169930 | A1 | 7/2008 | Mallison | |
| 2009/0328109 | A1 * | 12/2009 | Pavlovskaia | H04N 19/48 725/110 |
| 2010/0017259 | A1 * | 1/2010 | Luo | G06Q 30/02 705/400 |
| 2017/0353309 | A1 * | 12/2017 | Gray | G06F 21/51 |

(Continued)

FOREIGN PATENT DOCUMENTS

| | | | | |
|---|---|---|---|---|
| CN | 110110148 A | * | 8/2019 | G06Q 30/0625 |
| CN | 111681018 A | * | 9/2020 | G06V 40/20 |

(Continued)

OTHER PUBLICATIONS

U.S. Appl. No. 63/269,776 (Year: 2022).*

(Continued)

*Primary Examiner* — Duan Zhang
(74) *Attorney, Agent, or Firm* — BRYAN CAVE LEIGHTON PAISNER LLP

(57) ABSTRACT

In some embodiments, a method of managing value of assets is provided. A graphical representation of a digital asset associated with a non-fungible token stored in a distributed ledger is provided. User attention to the graphical representation of the digital asset is tracked, and a value of the digital asset is adjusted based on a level of attention of the tracked user attention and a number of users interacting with the graphical representation of the digital asset. A corresponding system and non-transitory computer-readable medium are also provided.

20 Claims, 4 Drawing Sheets

(56) References Cited

U.S. PATENT DOCUMENTS

| | | | | |
|---|---|---|---|---|
| 2018/0082323 | A1* | 3/2018 | Tsuruta | G06Q 30/0235 |
| 2019/0378164 | A1* | 12/2019 | Eich | H04N 21/44204 |
| 2020/0184547 | A1 | 6/2020 | Andon et al. | |
| 2020/0242105 | A1 | 7/2020 | Rich et al. | |
| 2020/0250455 | A1* | 8/2020 | Greenwald | G06V 10/40 |
| 2020/0273048 | A1 | 8/2020 | Andon et al. | |
| 2021/0358038 | A1* | 11/2021 | Vandenberg | G06Q 20/405 |
| 2023/0306390 | A1* | 9/2023 | Ahmed | H04L 9/50 |

FOREIGN PATENT DOCUMENTS

| | | | | |
|---|---|---|---|---|
| WO | WO-2014026064 | A2 * | 2/2014 | G06Q 30/0206 |
| WO | 2021/062160 | A1 | 4/2021 | |

OTHER PUBLICATIONS

Wang Fei-Yue et al., Nonfungible Tokens: Constructing Value Systems in Parallel Societies, IEEE Transactions on Computational Social Systems, vol. 8, No. 5, Sep. 30, 2021, pp. 1062-1067.

Lawrence J. Trautman, Virtual Art and Non-Fungible Tokens, SSRN Electronic Journal, Jan. 1, 2021, pp. 361-426.

* cited by examiner

300

CRYPTOGRAPHIC DIGITAL ASSETS MANAGEMENT SYSTEM

FIELD

The current disclosure relates generally to computer systems, and more specifically to a system, method and computer-readable medium enabling cryptographic digital assets management.

BACKGROUND

Value of assets, whether they are physical or digital assets, may change according to difference circumstances. For example, the value of an art piece in a museum may change based on market price as related to supply and demand, trends, owner, economic situation, and the like. However, factors such as the attention to the art piece are generally not exploited for determining such value adjustments. This is especially true under mobility-restricting situations, such as pandemics, where most visits to museums, art galleries, or exhibition halls may be banned. This situation further limits the rentability of having such pieces in exhibition, as visits are forbidden in such a type of situation. What is thus desired are systems and methods that enable adjusting the value of assets in a way that better reflects the actual significance of the assets, even under mobility-restricting conditions.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a method of managing value of assets is provided. A graphical representation of a digital asset associated with a non-fungible token stored in a distributed ledger is provided. User attention to the graphical representation of the digital asset is tracked, and a value of the digital asset is adjusted based on a level of attention of the tracked user attention and a number of users interacting with the graphical representation of the digital asset.

In some embodiments, providing the graphical representation of the digital asset associated with the non-fungible token stored in the distributed ledger may include providing the graphical representation within a virtual environment; and tracking user attention to the graphical representation of the digital asset may include tracking user attention to the graphical representation within the virtual environment.

In some embodiments, the method may further include associating the digital asset to a physical asset in a physical world, where a value of the physical asset is associated to the value of the digital asset; tracking attention to the physical asset in the physical world; and further adjusting the value of the digital asset based on the tracked attention to the physical asset in the physical world. In some embodiments, the method may also include connecting the graphical representation of the digital asset to one or more external channels that further drive attention to the digital asset.

In some embodiments, the method may also include fractionalizing the non-fungible token into a plurality of ownership tokens, where the value of the digital asset is distributed amongst the ownership tokens; and assigning at least a part of the plurality of ownership tokens to one or more owners of the digital asset. The level of attention may be based on at least one of a time of engagement with the graphical representation of the digital asset and on a type of engagement with the graphical representation of the digital asset. In some embodiments, each ownership token represents one or more of a voting right, a transferability right, an authorship right, an access right, a selling right, and a payoff right.

In some embodiments, the level of attention based on the time of engagement is calculated relative to a time of engagement spent on other digital assets. In some embodiments, the type of engagement includes at least one of looking at the graphical representation of the digital asset, clicking on the graphical representation of the digital asset, and performing a transaction related to the digital asset.

In some embodiments, the method may also include storing a smart contract associated to the digital asset, where the smart contract is configured to authenticate ownership of the digital asset and to track any adjustments to the value of digital asset.

In some embodiments, a system of managing value of digital assets is provided. The system includes at least one server computer that includes at least one processor and memory storing instructions that, in response to execution by the at least one processor, cause the at least one server computer to provide a graphical representation of a digital asset associated with a non-fungible token stored in a distributed ledger connected to the at least one server computer via a network, track user attention to the graphical representation of the digital asset, and adjust a value of the digital asset based on a level of attention of the tracked user attention and a number of users interacting with the graphical representation of the digital asset.

In some embodiments, providing the graphical representation of the digital asset associated with the non-fungible token stored in the distributed ledger includes providing the graphical representation within a virtual environment; and tracking user attention to the graphical representation of the digital asset includes tracking user attention to the graphical representation within the virtual environment.

In some embodiments, the digital asset is associated to a physical asset in a physical world, and a value of the physical asset is associated to the value of the digital asset. In such embodiments, the system further includes at least one sensor configured to track attention to the physical asset in the physical world, and where the instructions further cause the at least one server computer to adjust the value of the digital asset based on the tracked attention to the physical asset in the physical world. In some embodiments, the graphical representation of the digital asset is connected to one or more external channels that further drive attention to the digital asset.

In some embodiments, the non-fungible token is fractionalized into a plurality of ownership tokens, where the value of the digital asset is distributed amongst the ownership tokens, and where the plurality of ownership tokens are assigned to two or more owners of the digital asset. In some embodiments, the level of attention is based on at least one of a time of engagement with the graphical representation of the digital asset and on a type of engagement with the graphical representation of the digital asset. In some embodiments, interactions with the graphical representation of the digital asset are performed via a user graphical representation created from a user video feed with a removed background that is inserted into a virtual environment.

In some embodiments, each ownership token represents one or more of a voting right, a transferability right, an authorship right, an access right, a selling right, and a payoff right. In some embodiments, the level of attention based on the time of engagement is calculated relative to a time of engagement spent on other digital assets. In some embodiments, the type of engagement includes at least one of looking at the graphical representation of the digital asset, clicking on the graphical representation of the digital asset, and performing a transaction related to the digital asset.

In some embodiments, a non-transitory computer readable medium is provided. The computer readable medium has instructions stored thereon which, in response to execution by at least one processor, cause at least one server computer to perform actions that include providing a graphical representation of a digital asset associated with a non-fungible token stored in a distributed ledger, tracking user attention to the graphical representation of the digital asset, and adjusting a value of the digital asset based on a level of attention of the tracked user attention and a number of users interacting with the graphical representation of the digital asset.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below, and particularly pointed out in the claims filed with the application. Such combinations have advantages not specifically recited in the above summary. Other features and advantages of the present invention will be apparent from the accompanying drawings and from the detailed description that follows below.

BRIEF DESCRIPTION OF THE DRAWINGS

Specific features, aspects and advantages of the present disclosure will be better understood with regard to the following description and accompanying drawings, where.

DETAILED DESCRIPTION

In the following description, reference is made to drawings which show by way of illustration various embodiments. Also, various embodiments will be described below by referring to several examples. It is to be understood that the embodiments may include changes in design and structure without departing from the scope of the claimed subject matter.

The current disclosure addresses at least some of the drawbacks described in the background through systems, methods and a computer-readable media enabling management of assets.

Embodiments of the current disclosure comprise providing assets in the form of unique cryptographic digital assets that are represented by corresponding one or more graphical representations in virtual environments. The cryptographic digital assets may be unique virtual objects with certified ownership and authenticity represented in the form of a non-fungible token stored in a distributed ledger. The cryptographic digital assets may exist only in the virtual form or may also represent a tangible object in the real world. The value of the cryptographic digital assets may be associated to the attention that the assets receive. Attention may primarily be measured in the virtual environment in the form of engagement and related time of engagement with the assets, but may also be combined with attention measurement in real environments, such as in art galleries, museums or exhibition halls.

The unique cryptographic digital assets provide for a non-fungible object that has certified ownership and authenticity, which may be stored in a distributed ledger. The value of the assets may then be adjusted based on tracked attention in the virtual world and, optionally, combined with the attention in the real world. The value of the assets may be stored and distributed in a plurality of ownership tokens, which may provide a variety of ownership entitlements to the owners of the cryptographic digital assets, and may be dynamically managed in smart contracts stored in the distributed ledger. Thus, embodiments of the current disclosure enable a more accurate way of managing value of assets that better represents the assets' significance even in situations with restricted mobility.

Figure 1:
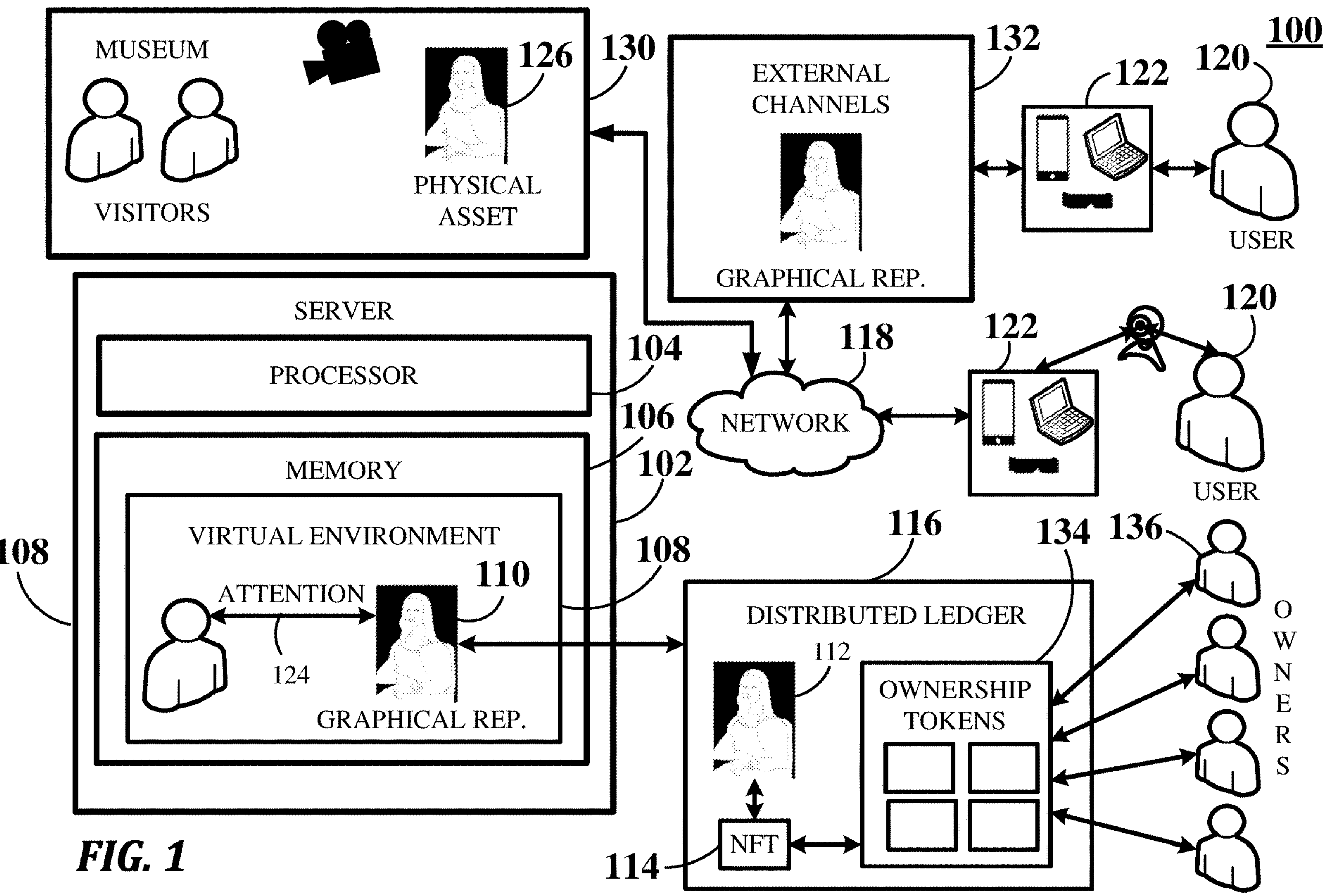
FIG. 1 depicts a cryptographic digital assets management system 100, according to an embodiment.

FIG. 1 depicts a cryptographic digital assets management system 100, according to an embodiment.

System 100 comprises at least one server computer 102 of a server computer system comprising at least one processor 104 and memory 106 storing a virtual environment 108 having at least one graphical representation 110 of a unique cryptographic digital asset 112. The cryptographic digital asset 112 may be represented by a corresponding non-fungible token 114 stored in a distributed ledger 116 connected to the at least one server computer 102 via a network 118.

A user 120 may access the virtual environment 108 via a client device 122 in order to interact with the cryptographic digital asset graphical representation 110. The at least one processor 104 is further configured to, when executing instructions in memory 106, track attention 124 of the user 120 interacting with the cryptographic digital asset graphical representation 110 within the virtual environment 108; and adjust a value of the cryptographic digital asset 112 based on a level of the tracked attention 124 and the number of users interacting with the at least one graphical representation 110. Thus, for example, a cryptographic digital asset 112 having receiving a higher level of attention from a higher number of users may have a higher value increase than one with a lower level of attention and lower number of users.

In some embodiments, the cryptographic digital asset 112 is associated to a physical asset 126, wherein the value of the physical asset 126 is associated to the value of the cryptographic digital asset 112. In a further embodiment, the system 100 further comprises at least one sensor, such as a visual sensor in a camera 128, configured to track attention to the physical asset 126 in a physical venue 130. In this embodiment, the at least one processor 104 is further configured to adjust the value of the cryptographic digital asset 112 based on the attention tracked in the real world.

For example, the original painting of the Mona Lisa, a physical asset 126, may be open for exhibition at a physical venue 130, such as the Louvre Museum. Simultaneously, a virtual replica of the Mona Lisa may be available at the virtual environment 108 in the form of a cryptographic digital asset graphical representation 110 connected to its corresponding cryptographic digital asset 112 in the distributed ledger 116. Attention to the Mona Lisa from one or more visitors 132 in the physical venue 130 recorded by, e.g., the camera 128, may affect the value of the unique cryptographic digital asset 112 of the Mona Lisa in the distributed ledger 116, which may be recorded in a smart contract associated to the non-fungible token 114 of the Mona Lisa. Thus, the at least one processor 104 may be configured to adjust the value of the cryptographic digital asset 112 based on the attention tracked in the real world. Furthermore, the system 100 may be configured to generate a smart contract associated to the cryptographic digital asset 112 configured to authenticate ownership of the cryptographic digital asset 112 and to track any adjustments to the value of cryptographic digital asset 112.

A "cryptographic digital asset" may refer to a computer-generated virtual object, including art pieces (e.g., art paintings, sculptures, monuments, buildings, historic sites, real estate, images, videos, music, and the like) that have a unique non-fungible token (NFT) registered on and validated by a blockchain platform or otherwise registered in an immutable database.

A "token" refers to a unit of data stored in a distributed ledger that represents at least a portion of a cryptographic digital asset.

A "non-fungible token" or "NFT" refers to a token that certifies that a cryptographic digital asset is authentic, unique and not interchangeable. NFTs may be created when blockchains string records of cryptographic hash, a set of characters verifying a set of data to be unique, onto previous records, creating a chain of identifiable data blocks.

A "smart contract" refers to a computer program or transaction protocol intended to automatically execute, control or document legally relevant events, such as a transaction or an adjustment of a value of a cryptographic digital asset, according to terms of a contract or an agreement recorded in a distributed ledger. A "distributed ledger" refers to an open, yet encrypted peer-to-peer network in which asset transaction records, also known as blocks, are linked via cryptographic hash functions in a distributed, immutable ledger of interconnected blocks. The distributed ledger may thus be consensually shared and synchronized across multiple sites, institutions or geographies, and may be accessed by multiple people. Distributed ledgers mat thus keep any transaction, ownership tokens, attention tracking and corresponding value adjustments in decentralized form across different locations and people without requiring a central authority to keep check against manipulation.

In some embodiments, the at least one graphical representation 110 of the cryptographic digital asset 112 is connected to one or more external channels 134, such as one or more applications or social media channels, that further drive attention to the cryptographic digital asset 112. For example, the graphical representation 110 may be displayed in one or more applications such as games, ads, applications, etc., connected to the distributed ledger 116, all of which may attract a plurality of users that may interact with the graphical representation 110 to further influence the value of the cryptographic digital asset 112.

In some embodiments, the non-fungible token is further fractionalized, or tokenized, into a plurality of ownership tokens 136, wherein the value of the cryptographic digital asset 112 is distributed amongst the ownership tokens 136. In some embodiments, the ownership tokens 136 may be further assigned two or more partial owners 138 of the cryptographic digital asset 112, which may purchase corresponding ownership tokens 136 from the original owner or the creator of the cryptographic digital asset 112. Such tokenization and transactions may be recorded in smart contracts stored in the distributed ledger 116. The ownership tokens 136 may further provide one or more entitlements to the partial owners 138 of the cryptographic digital asset 112. In further embodiments, the ownership tokens 136 entitle one or more of a voting right, transferability right, authorship right, access right, selling right, and payoff right, as will be described with more details with reference to FIG. 2.

In the current disclosure, an "ownership token" refers to a token created from fractionalizing, or tokenizing, an NFT into a plurality of parts or shares, each of which may be proportional to a value of the cryptographic digital asset and which may provide one or more entitlements over the cryptographic digital asset.

In the current disclosure, "fractionalizing" or "tokenizing" refers to the splitting of ownership of an NFT into smaller parts, each of which may be represented by an ownership token. Tokenization may rely on the use of smart contracts, which enables purchasing ownership tokens from an original owner of a cryptographic digital asset and receive shares thereof.

In some embodiments, the cryptographic digital assets 112 comprise a plurality of attributes that may describe properties of the cryptographic digital assets 112, wherein such attributes are stored as part of an encrypted alphanumeric string associated to the non-fungible token. Such attributes may be unique to the cryptographic digital assets 112, and may include properties such as colors, shape, author(s), owner(s), date and place of creation, location(s) in the virtual environment(s) and/or physical venue 130, and the like.

In some embodiments, interactions with the at least one graphical representation 110 of the cryptographic digital asset 112 are performed via a user graphical representation 140 created from a user video feed inserted into the virtual environment 108 with a removed background, wherein the video feed is sent by a user camera 142.

In some embodiments, the user graphical representation 140 comprises a user 3D virtual cutout with a removed background, or a user real-time 3D virtual cutout with a removed background, or a video with a removed background, or a video without a removed background.

In the current disclosure, a user 3D virtual cutout may include a virtual replica of a user constructed from a user-uploaded or third-party-source 2D photo. In an embodiment, the user 3D virtual cutout is created via a 3D virtual reconstruction process through machine vision techniques using the user-uploaded or third-party-source 2D photo as input data, generating a 3D mesh or 3D point cloud of the user with removed background. In one embodiment, the user 3D virtual cutout may have static facial expressions. In another embodiment, the user 3D virtual cutout may comprise facial expressions updated through the camera feed. In yet another embodiment, the user 3D virtual cutout may comprise expressions that may be changed through buttons on the user graphical interface, such as buttons that permit the user 3D virtual cutout to smile, frown, be serious, and the like. In yet a further embodiment, the user 3D virtual cutout uses combinations of aforementioned techniques to display facial expressions. After generating the user 3D virtual cutout, the status and/or facial expressions of the user 3D virtual cutout may be continuously updated by, e.g., processing the camera feed from the user.

A user real-time 3D virtual cutout may include a virtual replica of a user based on the real-time 2D or 3D live video stream data feed obtained from the camera and after having the user background removed. In an embodiment, the user real-time 3D virtual cutout is created via a 3D virtual reconstruction process through machine vision techniques using the user live data feed as input data by generating a 3D mesh or 3D point cloud of the user with removed background. For example, the user real-time 3D virtual cutout may be generated from 2D video from a camera (e.g., a webcam) that may be processed to create a holographic 3D mesh or 3D point cloud. In another example, the user real-time 3D virtual cutout may be generated from 3D video from depth cameras (e.g., LIDARs or any depth camera) that may be processed to create a holographic 3D mesh or 3D point cloud. Thus, the user real-time 3D virtual cutout represents the user graphically in three dimensions and in real time.

A video with removed background may include a video streamed to a client device, wherein a background removal process has been performed so that only the user may be visible and then displayed utilizing a polygonal structure on the receiving client device. The video without removed background may include a video streamed to a client device, wherein the video is faithfully representing the camera capture, so that the user and his or her background are visible and then displayed utilizing a polygonal structure on the receiving client device. The polygonal structure can be a quad structure or more complex 3D structures used as a virtual frame to support the video.

In some embodiments, the data used as input data comprised in the live data feed and/or user-uploaded or third-party-source 2D photo comprises 2D or 3D image data, 3D geometries, video data, media data, audio data, textual data, haptic data, time data, 3D entities, 3D dynamic objects, textual data, time data, metadata, priority data, security data, positional data, lighting data, depth data, and infrared data, amongst others.

The virtual environment 108 may refer to a virtual scene, world or universe where users can explore and interact with cryptographic digital assets therein, communicate with each other, and the like. The virtual environment 108 comprises assets that may be modeled through a plurality of software platforms or software engines. The assets may be defined in a scene description, which may be in the form of a scene graph comprising properties and values and which may be based on models. The models are descriptions of a three-dimensional object defined by data comprising geometry, textures, physics, lighting, materials, etc.

A virtual environment 108 thus refers to a virtual construct (e.g., a virtual model) that may be designed through any suitable 3D modelling technique through computer assisted drawing (CAD) methods. In some embodiments, the virtual environment 108 refers to a virtual construct that is scanned from a real construct (e.g., a physical room) through any suitable scanning tools, comprising image-scanning pipelines input through a variety of photo, video, depth measurements, and/or simultaneous location and mapping (SLAM) scanning in order to generate the virtual environment 108. For example, radar-imaging, such as synthetic-aperture radars, real-aperture radars, Light Detection and Ranging (LIDAR), inverse aperture radars, monopulse radars, and other types of imaging techniques may be used to map and model real-world constructs and turn them into a virtual environment 108. In other embodiments, the virtual environment 108 is a virtual construct that is modelled after a real construct (e.g., a room, building or facility in the real world).

The assets, including graphical representations 110 of the cryptographic digital assets included in the virtual environment 108 may comprise any of 2D or 3D image data, 3D geometries, video data, media data, audio data, textual data, haptic data, time data, 3D entities, 3D dynamic objects, textual data, time data, priority data, security data, positional data, lighting data, depth data, infrared data, and corresponding metadata, amongst others. In some embodiments, the graphical representations 110 of the cryptographic digital assets are virtual replicas of physical assets 126, in such a way that the graphical representations 110 comprise graphics including textures, colors, and resolutions that enable users to view the graphical representations 110 in a very realistic way that mimics the original, physical assets as close as possible.

In some embodiments, the client devices 122 may be one or more of mobile devices, personal computers, laptops, game consoles, media centers, smart contact lenses, and head-mounted displays, amongst others. The user cameras 142 may be one or more of a 2D or 3D camera, 360-degree camera, web-camera, RGBD camera, CCTV camera, professional camera, mobile phone camera, depth camera (e.g., LIDAR), or a light-field camera, amongst others.

In some embodiments, the virtual environment 108 utilizes a hybrid system architecture, which includes a client-server side and a peer-to-peer (P2P) side. In an embodiment the client-server side comprises web or application servers. The client-server side may be further configured to include secure communication protocols; micro-services; a database management system; a database; and/or a distributed message and resource distribution platform. Server-side components may be provided along with the client devices that communicate to the servers through a network. The client-server side defines the interaction between the one or more clients and the server through the network, including any processing performed by a client side, a server side, or a receiving client side. In an embodiment, one or more of the corresponding clients and servers perform the image and media processing according to various rule-based task allocation combinations. In an embodiment, the web or application servers are configured to receive client requests employing the secure communication protocols and process the client requests by requesting the micro-services or data corresponding to the requests from the database using a database management system. The micro-services are distributed utilizing a distributed message and resource distribution platform using the publish-subscribe model.

The P2P side comprises a P2P communication protocol enabling real-time communication between client devices in the virtual environment; and a rendering engine configured to enable the client device to perform real-time 3D rendering of live session elements therein included (e.g., user graphical representations) in the virtual environment. An example of a suitable P2P communication protocol may be a Web Real-Time Communication (WebRTC) communication protocol, which is collection of standards, protocols, and JavaScript APIs, which, in combination, enable P2P audio, video, and data sharing between peer client devices. An example of a suitable rendering engine may be 3D engines based on WebGL, which is a JavaScript API for rendering 2D and 3D graphics within any compatible web browser without the use of plug-ins, allowing accelerated usage of physics and image processing and effects by one or more processors of the client device (e.g., one or more graphic processing units (GPUs)). In an embodiment, the P2P side further includes a computer vision library configured to enable the client device to perform real-time computer vision tasks in the virtual environment. An example of a suitable computer vision library may be OpenCV, which is a library of programming functions configured mainly for real-time computer vision tasks. Using such a hybrid model of communication may enable rapid P2P communications between users reducing latency problems while providing web services and resources to each session, enabling a plurality of interactions between users and with content in the virtual environment.

In some embodiments, the client devices 122 and at least one cloud server computer 102 connect through a wired or wireless network. In some embodiments, the network may include millimeter-wave (mmW) or combinations of mmW and sub 6 GHz communication systems, such as 5th generation wireless systems communication (5G). In other embodiments, the system may connect through wireless local area networking (Wi-Fi). In other embodiments, the system may communicatively connect through 4th generation wireless systems communication (4G), may be supported by 4G communication systems, or may include other wired or wireless communication systems.

Figure 2:
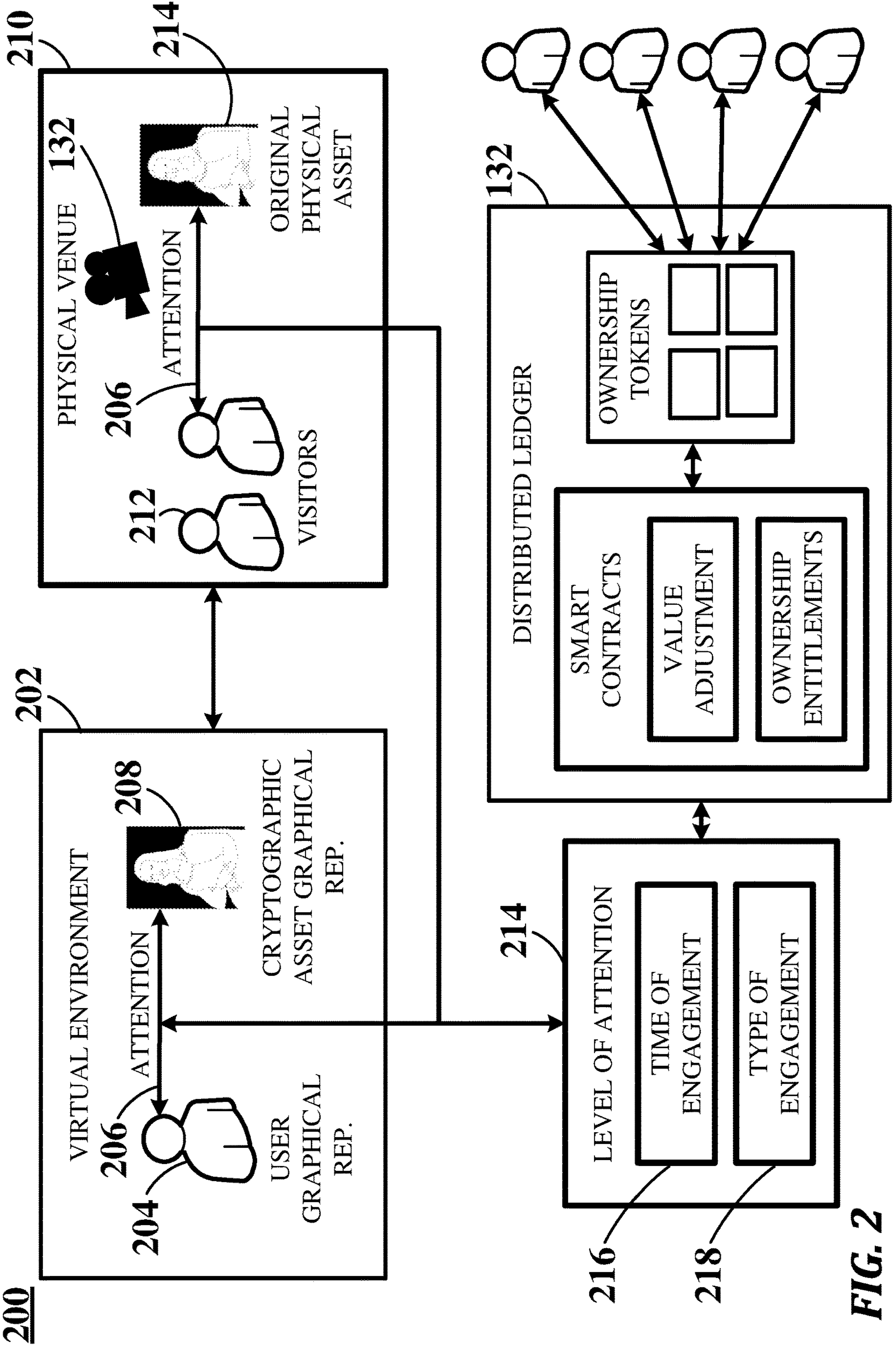
FIG. 2 depicts an attention management system 200 of the cryptographic digital assets management system 100 of FIG. 1, according to an embodiment.

FIG. 2 depicts an attention management system 200 of the cryptographic digital assets management system 100 of FIG. 1, according to an embodiment.

In the attention management system 200, a virtual environment 202 comprises a user graphical representation 204 paying attention 206 to a cryptographic digital asset graphical representation 208. Furthermore, a physical venue 210, such as a museum, may host one or more visitors 212 that are paying attention 206 to an original physical asset 214 upon which the cryptographic digital asset graphical representation 208 may be based and which is associated to cryptographic digital asset. The attention 206 in the virtual environment 202 and in the physical venue 210 may be tracked in real-time and may be used to perform a value adjustment 216 of a cryptographic digital asset associated to the corresponding cryptographic digital asset graphical representation 208 and original physical asset 214.

In one embodiment, a level of attention 218, as tracked in the virtual environment 202 and/or physical venue 210, is based on a time of engagement 220, or on a type of engagement 222, or a combination thereof, with the cryptographic digital asset graphical representation 208 or original physical asset 214 of the at least one cryptographic digital asset. The time of engagement 220 refers to the time that is spent by at least one user, either in the form of a user graphical representation 204 or visitor 212, interacting with either a cryptographic digital asset graphical representation 208 or original physical asset 214. Such interactions may vary according to whether they take place in the virtual environment 202 or in the physical venue 210.

For example, in the virtual environment 202, the interactions may take place in the form of seeing or looking at a cryptographic digital asset graphical representation 208, and further on clicking on the cryptographic digital asset graphical representation 208, engaging with the cryptographic digital asset graphical representation 208, or performing a transaction related to the cryptographic digital asset. Those transactions may refer to social transactions or commercial transactions, as will be defined below. Each of these interactions may comprise a different priority score that provides a corresponding level of interaction and modifies an associated value to the cryptographic digital asset. For example, an interaction of seeing may comprise a lower score than that of looking; an interaction of clicking may provide a higher score than both an interaction of seeing and looking; and an interaction of engaging with the cryptographic digital asset graphical representation 208 may provide a higher score than the previous interactions; and performing transactions related to the cryptographic digital asset may be the highest form of level of interaction.

In some embodiments, an amount of attention may be determined by calculating a score based on the time of engagement 220 and the type of engagement 222, and the amount of attention may be compared to one or more thresholds in order to determine the level of attention 218 (e.g., a low level of attention, a medium level of attention, or a high level of attention). In some embodiments, the score based on the time of engagement 220 and the type of engagement 222 may be used directly as a measurement of the level of attention 218.

The term "seeing", as used in the current disclosure, refers to the act of directing one's eyes for a limited number of seconds (i.e., including a time component) or towards a limited number of interest points (i.e., including a space component) in the direction of the cryptographic digital asset graphical representation 208.

The term "looking", as used in the current disclosure, may also include a time component and/or a space component, and refers to the act of fixing one's eyes for a number of seconds greater than that of "seeing", or to a certain number of interest points greater than that of "seeing" in the direction of the cryptographic digital asset graphical representation 208.

The term "engaging", as used in the current disclosure, refers to deeper levels of interaction including gestures, facial expressions, speech, touch, stylus movements, air gestures, brain activity, and head and eye movements in the direction of the cryptographic digital asset graphical representation 208 but excluding the simpler forms of interaction such as looking, seeing, and clicking.

The term "commercial transactions" herein refers to downloading, purchasing, selling, transferring, and exchanging one or more items related to the cryptographic digital asset. The term "social transactions" herein refers to rating, liking, or reviewing the cryptographic digital asset or one or more related items.

Likewise, in the physical venue 210, interactions may comprise seeing, looking at and performing transactions related to the original physical asset 214 (e.g., souvenirs, downloading applications, etc.) an original physical asset 214. However, other types of engagements such as described above may not be enabled in real life. Interactions in the physical venue 210 may be tracked via one or more cameras 234. In some embodiments, the system 200 generates smart contracts 224 associated to the cryptographic digital asset configured to authenticate ownership of the cryptographic digital asset and to track any value adjustments 216 and ownership entitlements 226 of cryptographic digital asset. The smart contracts 224 may be stored in a distributed ledger 228 that may provide the infrastructure used to support authentication of the ownership of the cryptographic digital asset. The original ownership authentication may be comprised in an NFC. In yet further embodiments, the NFC is fractionalized into a plurality of ownership tokens 230, wherein the value of the cryptographic digital asset is distributed amongst the ownership tokens 230. In this embodiment, the plurality of ownership tokens 230 are assigned to two or more partial owners 232 of the cryptographic digital asset. Each ownership token 230 identifies a unique owner ID code for the corresponding partial owner 232 that authenticates ownership and/or tracks attention and or/future transactions related to the cryptographic digital asset. The unique owner ID code may be linked with a cryptocurrency wallet registered with the distributed ledger 228.

In some embodiments, the ownership entitlements 226 may entitle one or more of a voting right, transferability right, authorship right, access right, selling right, and payoff right. The voting right may refer to a right to vote for a modification of an attribute of the cryptographic digital asset. Such attributes may be unique to the cryptographic digital assets, and may include properties such as colors, shape, author(s), owner(s), date and place of creation, location(s) in the virtual environment 202 and/or physical venue 210, and the like. For example, the voting right may enable a partial owner 232 to vote for a restoration of an original physical asset 210 or to change the location of the same. A transferability right may refer to a right to transfer the corresponding ownership token 230 to another partial owner 232. The authorship right may refer to specific rights that the original author of a cryptographic digital asset (e.g., a painter or sculptor of an original physical asset 214 associated to the cryptographic digital asset, or a creator of a digital asset such as a song or picture that is made into a cryptographic digital asset), such as receiving an author royalty fee on any revenues received related to the cryptographic digital asset. An access right may enable a partial owner 232 to access cryptographic digital asset information such as viewing other ownership entitlements 226 or having access to view all attributes of the cryptographic digital asset. The selling right may provide entitlement to sell the ownership token to someone else. The payoff right may provide the right to receive a payoff from any profits made on the cryptographic digital asset proportional to the possessed ownership tokens.

Figure 3:
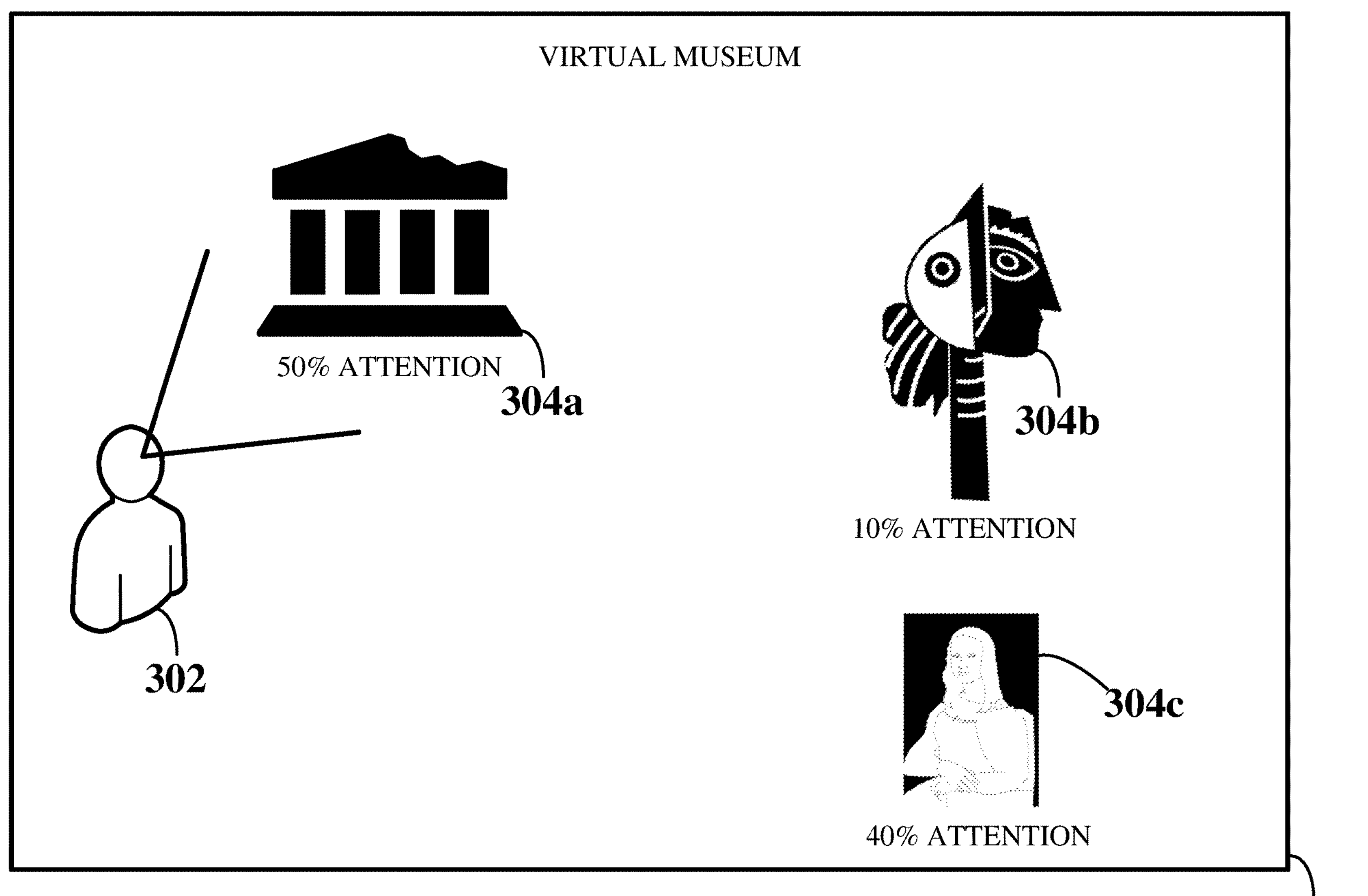
FIG. 3 depicts an example illustration of a virtual museum 300 where a user 302 is engaging with a plurality of graphical representations 304*a-c* of corresponding cryptographic digital assets.

FIG. 3 depicts an example illustration of a virtual museum 300 where a user 302 is engaging with a plurality of graphical representations 304*a-c* of corresponding cryptographic digital assets.

In one embodiment depicted in FIG. 3, the value associated to the time of engagement of user 302 with respect to each graphical representations 304*a-c* is calculated relative to the time of engagement spent on other cryptographic digital assets. For example, if user 302 spends two hours of time in the museum 300 (e.g., a virtual or a real museum), and the user 302 spends one hour of his or her time paying attention to cryptographic digital asset graphical representation 304*a*, then 50% of his or her time was spent on the cryptographic digital asset graphical representation 304*a* and a corresponding value adjustment is performed in which a higher value is provided to cryptographic digital asset corresponding to the graphical representation 304*a* than to the other two graphical representations 304*b*-304*c*.

Figure 4:
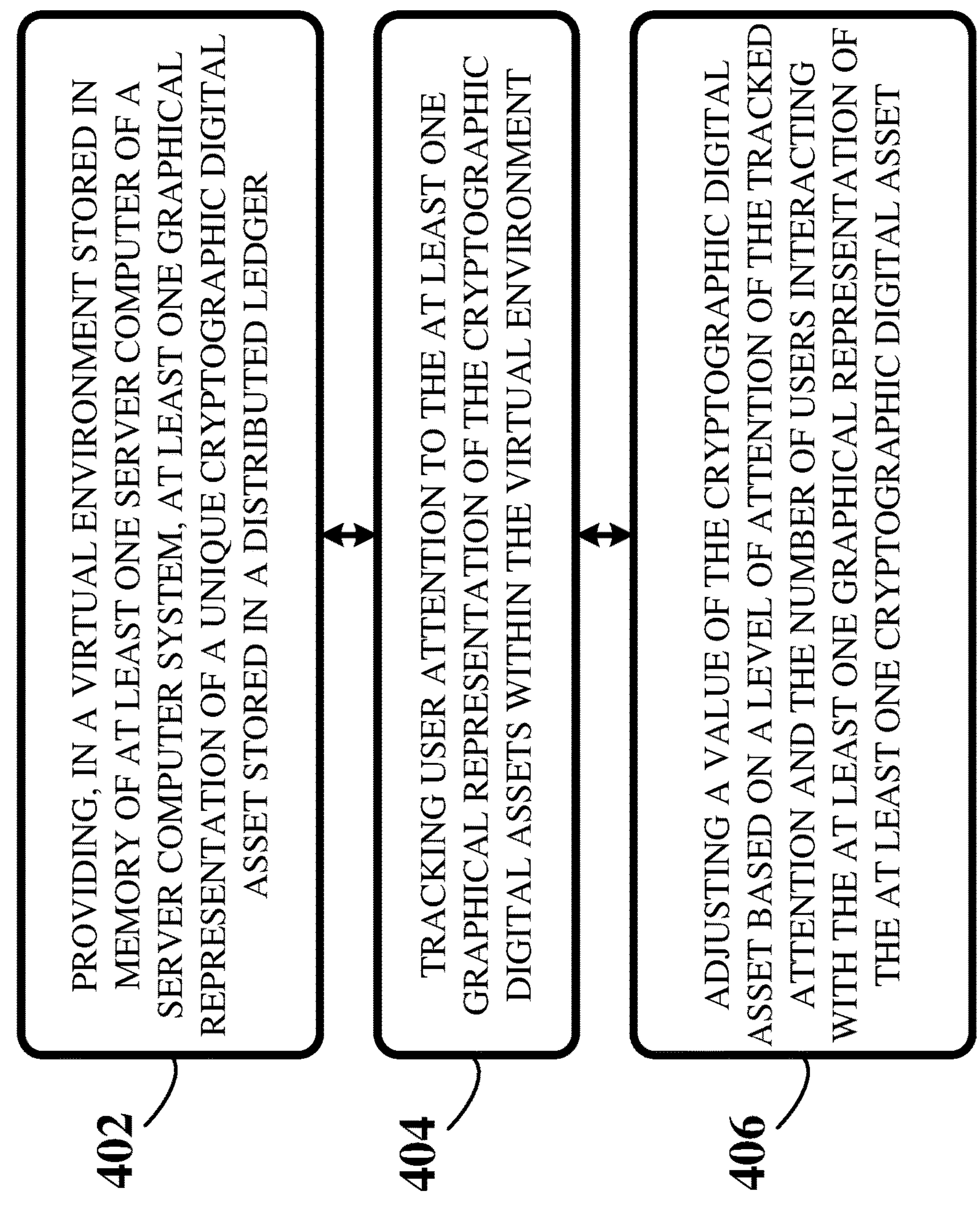
FIG. 4 depicts a cryptographic digital assets management method 400, according to an embodiment.

FIG. 4 depicts a cryptographic digital assets management method 400, according to an embodiment.

Method 400 may be implemented by a system, such as systems 100-200 depicted in FIG. 1-FIG. 2. Method 400 starts in step 402 by providing, in a virtual environment stored in memory of at least one server computer of a server computer system, at least one graphical representation of a unique cryptographic digital asset comprising a corresponding non-fungible token stored in a distributed ledger. Then, in step 404, method 400 continues by tracking user attention to the at least one graphical representation of the cryptographic digital assets within the virtual environment. Finally, in step 406, method 400 ends by adjusting a value of the cryptographic digital asset based on a level of attention of the tracked attention and the number of users interacting with the at least one graphical representation of the at least one cryptographic digital asset.

In some embodiments, method 400 further comprises associating the cryptographic digital asset to a physical asset, wherein the value of the physical asset is associated to the value of the cryptographic digital asset. In yet further embodiments, method 400 further comprises tracking attention to the physical asset in the physical world; and further adjusting the value of the cryptographic digital asset based on the attention tracked in the real world.

In some embodiments, method 400 comprises connecting at least one graphical representation of the cryptographic digital asset to one or more external channels that further drive attention to the cryptographic digital asset.

In some embodiments, method 400 comprises fractionalizing parts of the non-fungible token into a plurality of ownership tokens, wherein the value of the cryptographic digital asset is distributed amongst the ownership tokens; and assigning at least a part of the plurality of ownership tokens to one or more partial owners of the cryptographic digital asset. In yet further embodiments, wherein the ownership tokens entitle one or more of a voting right, transferability right, authorship right, access right, selling right, and payoff right.

In some embodiments, the level of attention is based on time of engagement, or on the type of engagement, or a combination thereof, with the graphical representation of the at least one cryptographic digital asset. In yet further embodiments, wherein the value associated to the time of engagement is calculated relative to the time of engagement spent on other cryptographic digital assets. In yet further embodiments, the type of engagement comprises seeing or looking at the graphical representation, clicking, engaging or performing a transaction related to the cryptographic digital asset.

In some embodiments, the method 400 further comprises generating a smart contract associated to the cryptographic digital asset configured to authenticate ownership of the cryptographic digital asset and to track any adjustments to the value of cryptographic digital asset.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. The description is thus to be regarded as illustrative instead of limiting.

The embodiments of the invention in which an exclusive property or privilege is claimed are defined as follows:

1. A method of managing a value of a digital asset, comprising:

providing a graphical representation of a digital asset;

tracking user attention to the graphical representation of the digital asset;

associating the digital asset to a physical asset in a physical world, wherein a value of the physical asset is associated to the value of the digital asset; tracking attention to the physical asset in the physical world using at least one sensor;

combining a level of attention of the tracked user attention of the digital asset, a number of users interacting with the graphical representation of the digital asset, and the tracked attention to the physical asset in the physical world; and adjusting a value of the digital asset based on the combined level of attention;

wherein providing the graphical representation of the digital asset includes providing a virtual environment and providing the graphical representation within the virtual environment;

wherein providing the virtual environment comprises 3D modelling a real-world construct or a virtual construct, and providing the graphical representation of the digital asset comprises modelling the graphical representation of the digital asset with a software platform or software engine;

wherein tracking user attention to the graphical representation of the digital asset includes tracking user attention to the graphical representation within the virtual environment;

wherein the interactions with the graphical representation of the digital asset are performed via a user graphical representation; and wherein the user graphical representation is a user real-time 3D virtual cutout created based on a real-time 2D or 3D live video stream data feed with a removed background obtained from the user device.

2. The method of claim 1, wherein the level of attention of the tracked attention of the physical asset in the physical world is based on a time of engagement with the physical asset in the physical world.

3. The method of claim 1, comprising connecting the graphical representation of the digital asset to one or more external channels that further drive attention to the digital asset.

4. The method of claim 1, wherein the level of attention is measured by comparing a score with a threshold value, the score being determined based on at least one of a time of engagement with the graphical representation of the digital asset and a type of engagement with the graphical representation of the digital asset.

5. The method of claim 4, wherein score based on the time of engagement is calculated relative to a time of engagement spent on other digital assets.

6. The method of claim 4, wherein the type of engagement includes at least one of looking at the graphical representation of the digital asset, clicking on the graphical representation of the digital asset, and performing a transaction related to the digital asset.

7. The method of claim 1, further comprising storing a smart contract associated to the digital asset, wherein the smart contract is configured to authenticate ownership of the digital asset and to track any adjustments to the value of digital asset.

8. A method of managing a value of a digital asset comprising:

providing a graphical representation of a digital asset associated with a non-fungible token stored in a distributed ledger;

tracking user attention to the graphical representation of the digital asset;

tracking a number of users interacting with the graphical representation of the digital asset;

adjusting a value of the digital asset based on the tracked user attention;

wherein providing the graphical representation of the digital asset associated with the non-fungible token stored in the distributed ledger includes providing a virtual environment and providing the graphical representation within the virtual environment;

wherein providing the virtual environment comprises 3D modelling a real-world construct or a virtual construct, and providing the graphical representation of the digital asset comprises modelling the graphical representation of the digital asset with a software platform or software engine;

wherein tracking user attention to the graphical representation of the digital asset includes tracking user attention to the graphical representation within the virtual environment;

wherein the interactions with the graphical representation of the digital asset are performed via a user graphical representation; and wherein the user graphical representation is a user real-time 3D virtual cutout created based on a real-time 2D or 3D live video stream data feed with a removed background obtained from the user device.

9. The method of claim 1, wherein the user real-time 3D virtual cutout is created via a 3D virtual reconstruction process through machine vision techniques using the user live data feed.

10. The method of claim 8, wherein the user real-time 3D virtual cutout is created via a 3D virtual reconstruction process through machine vision techniques using the user live data feed.

11. The method of claim 8, wherein the graphical representation of the digital asset is connected to one or more external channels that further drive attention to the digital asset.

12. The method of claim 8, wherein the non-fungible token is fractionalized into a plurality of ownership tokens, wherein the value of the digital asset is distributed amongst the ownership tokens, and wherein the plurality of ownership tokens are assigned to two or more owners of the digital asset.

13. The method of claim 12, wherein each ownership token represents one or more of a voting right, a transferability right, an authorship right, an access right, a selling right, and a payoff right.

14. The method of claim 10, wherein the tracked user attention is measured by comparing a score with a threshold value, the score being determined based on at least one of a time of engagement with the graphical representation of the digital asset and a type of engagement with the graphical representation of the digital asset.

15. The method of claim 14, wherein the score based on the time of engagement is calculated relative to a time of engagement spent on other digital assets.

16. The method of claim 14, wherein the type of engagement includes at least one of looking at the graphical representation of the digital asset, clicking on the graphical representation of the digital asset, and performing a transaction related to the digital asset.

17. A method of managing a digital asset comprising:

providing a graphical representation of a digital asset;

tracking user attention to the graphical representation of the digital asset;

tracking a number of users interacting with the graphical representation of the digital asset and the tracked attention to the physical asset in the physical world;

adjusting a value of the digital asset based on the combined level of tracked user attention;

wherein providing the graphical representation of the digital asset includes providing a virtual environment and providing the graphical representation within the virtual environment;

wherein providing the virtual environment comprises 3D modelling a real-world construct or a virtual construct, and providing the graphical representation of the digital asset comprises modelling the graphical representation of the digital asset with a software platform or software engine;

wherein tracking user attention to the graphical representation of the digital asset includes tracking user attention to the graphical representation within the virtual environment;

wherein the interactions with the graphical representation of the digital asset are performed via a user graphical representation; and wherein the user graphical representation is a user real-time 3D virtual cutout created based on a real-time 2D or 3D live video stream data feed with a removed background obtained from the user device.

18. The method of claim 17, wherein the user real-time 3D virtual cutout is created via a 3D virtual reconstruction process through machine vision techniques using the user live data feed.

19. The method of claim 17, wherein the tracked user attention is measured by comparing a score with a threshold value, the score being determined based on at least one of a time of engagement with the graphical representation of the digital asset and a type of engagement with the graphical representation of the digital asset.

20. The method of claim 19, wherein the score based on the time of engagement is calculated relative to a time of engagement spent on other digital assets.

* * * * *